No. 888,181. PATENTED MAY 19, 1908.
F. H. LINDNER.
TURBINE.
APPLICATION FILED AUG. 10, 1907.
5 SHEETS—SHEET 1.
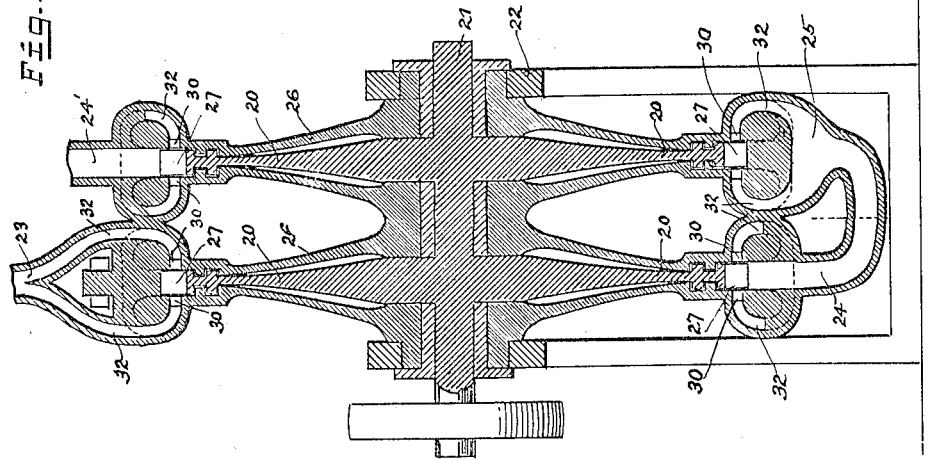
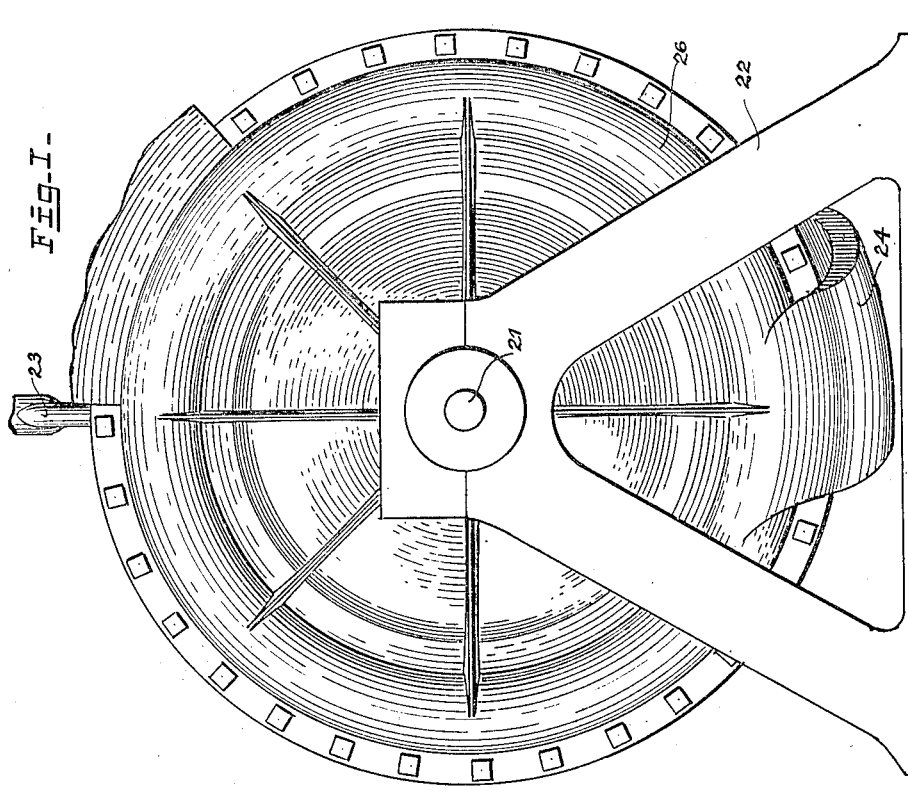
WITNESSES:
A. Faber du Faur
Sally C. Yudzky
Frank H. Lindner INVENTOR
BY Fred'k P. Schuetz
ATTORNEY

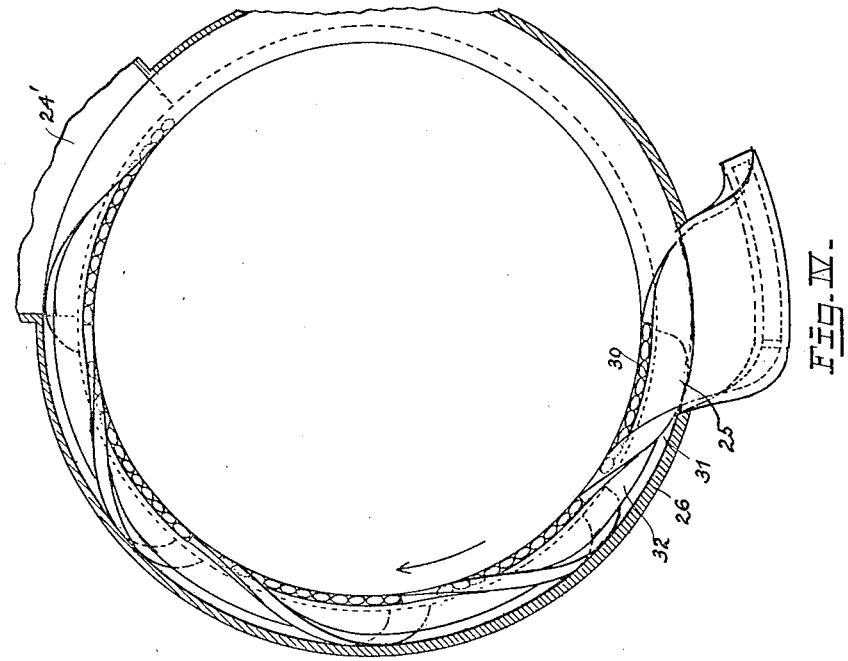
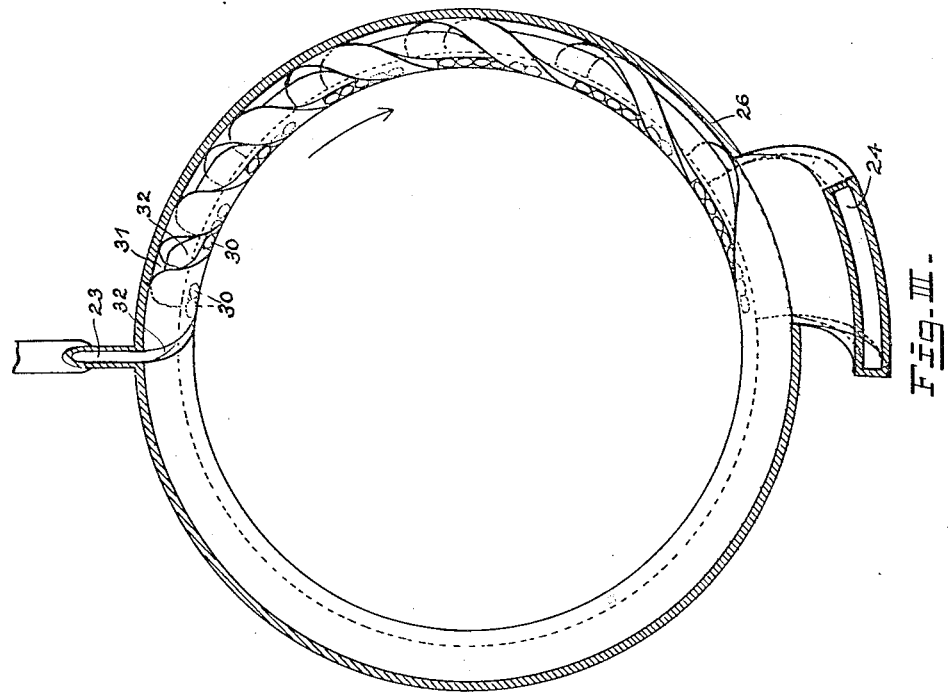

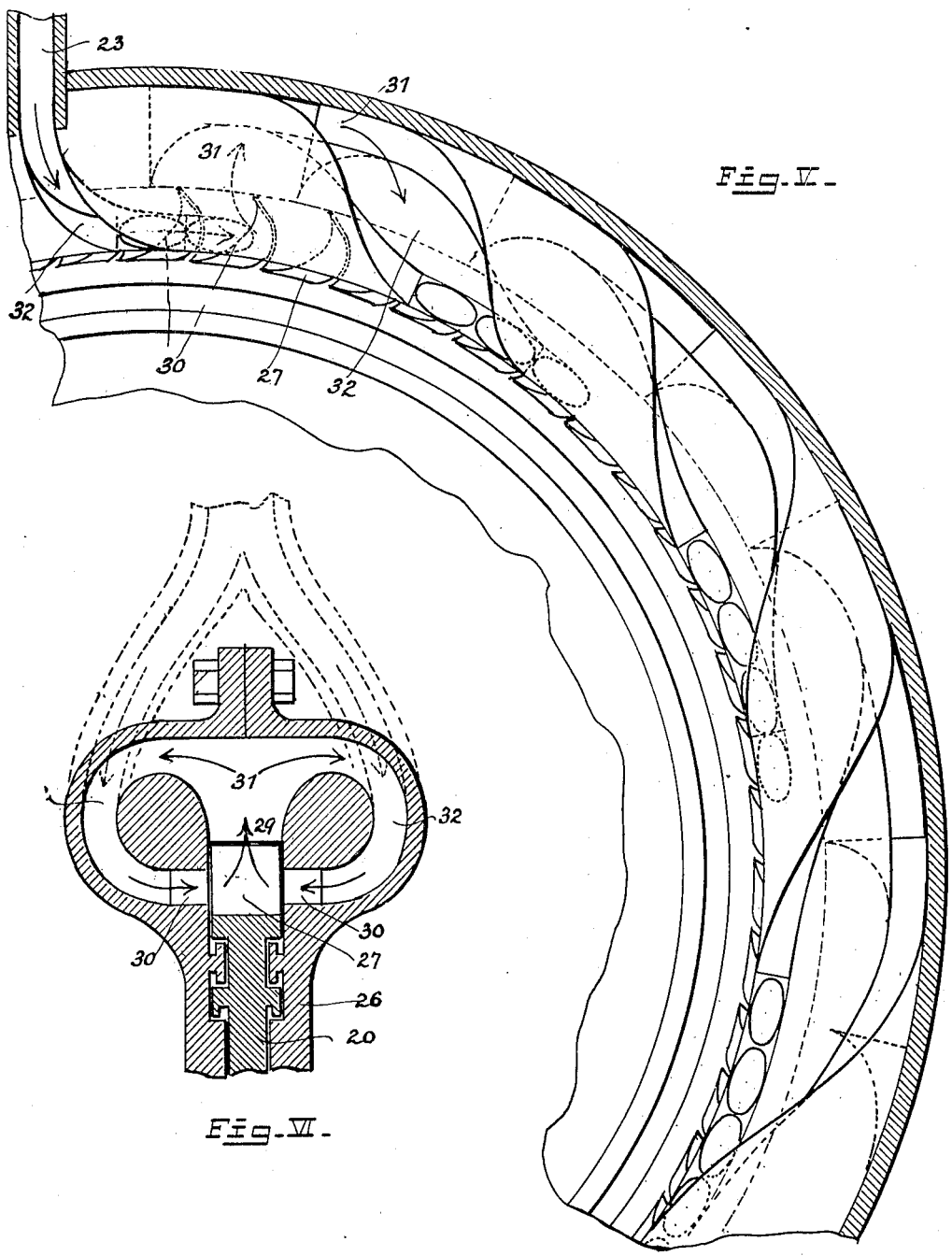

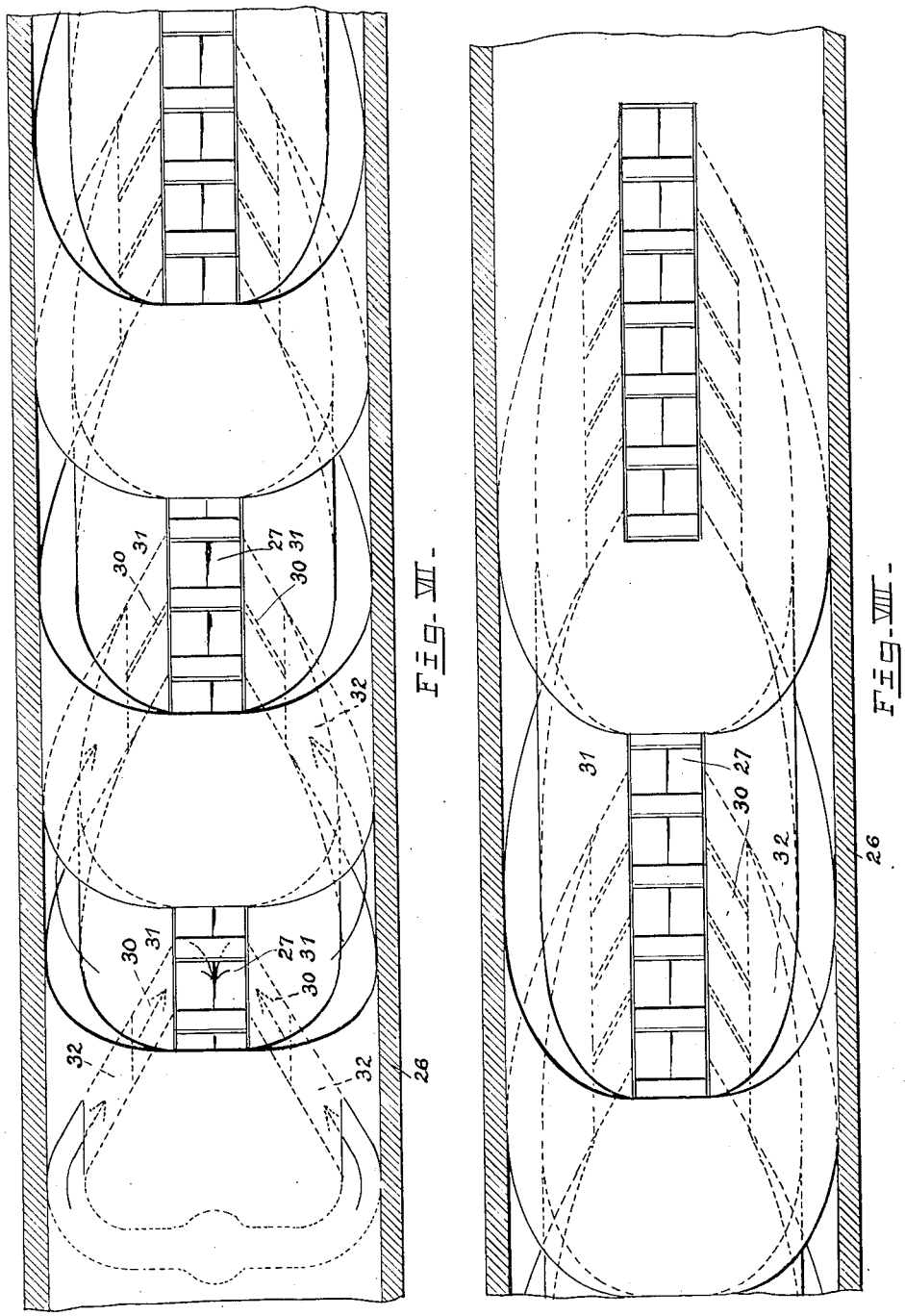

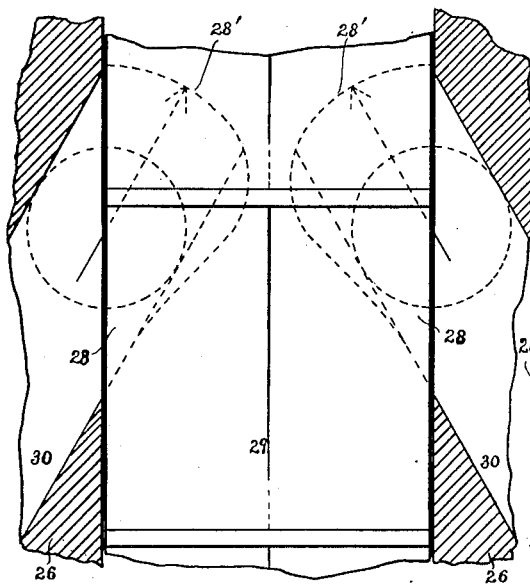
Fig. IX.
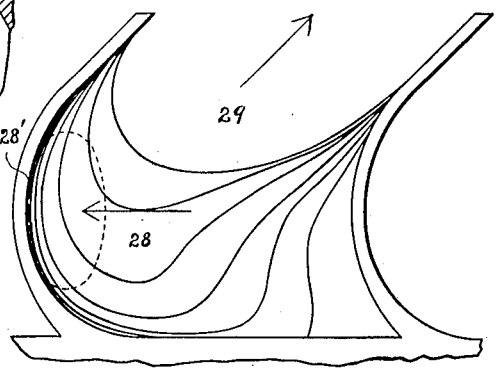
Fig. X.
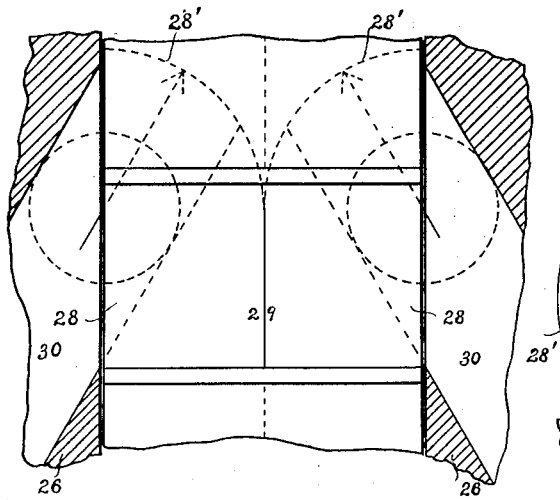
Fig. XI.
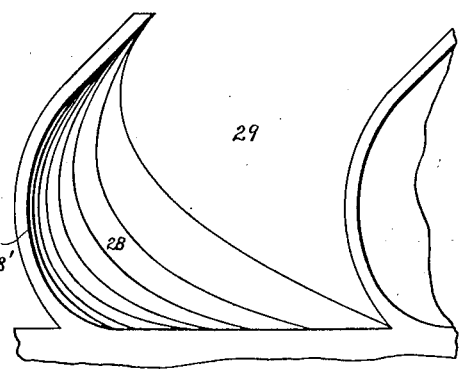
Fig. XII.

UNITED STATES PATENT OFFICE.

FRANK H. LINDNER, OF BAYONNE, NEW JERSEY.

TURBINE.

No. 888,181.  Specification of Letters Patent.  Patented May 19, 1908.

Application filed August 10, 1907. Serial No. 387,991.

*To all whom it may concern:*

Be it known that I, FRANK H. LINDNER, a citizen of the United States, and a resident of Bayonne, in the county of Hudson and State of New Jersey, have invented certain new and useful Improvements in Turbines, of which the following is a specification.

My invention relates to elastic fluid turbines, and has for its object a simple, effective and balanced turbine adapted to multistage and compound action. I attain this object by the mechanism illustrated in the accompanying drawings in which—

Figure 1 is a front elevation of a compound turbine. Figs. 2 to 8 are diagrammatic sections. Figs. 9 and 10 are views illustrating the preferred form of bucket. Figs. 11 and 12 are views illustrating a modified form of bucket.

Similar characters of reference designate corresponding parts throughout the several views.

In the drawings, 20 designates a wheel disk or disks adapted to rotate with the shaft 21 journaled in suitable bearings of a frame 22. In Figs. 1 to 4 I have illustrated the turbine compounded, two wheel disks being shown, the steam being admitted through the inlet 23, and the exhaust from the first wheel disk conducted through the exhaust port 24 to the inlet port 25 of the second wheel disk. A casing 26 incloses each wheel and when a number of wheel disks are employed the outlet ports of the first wheel are connected to the inlet ports of the next wheel and so on, the final exhaust 24' leading to the atmosphere or into a suitable condenser. The wheel disks under certain conditions may also be arranged to act separately, so that one or more may be cut out when desired.

In the drawings, Fig. 3 shows the section of the disk wheel acted upon by streams of fluid in seven stages progressing around one-half of the disk and in the direction of the arrow; and in Fig. 4 the steam is shown continued in five stages progressing in the direction of the arrow around substantially the other half of the succeeding disk. However, I do not wish to confine myself to the number of stages of expansion shown in the drawings, and may also employ stages progressing in opposite direction. I also do not wish to limit myself to the number of disks compounded. In con-
nection with the same I employ the usual devices for lubrication, regulation and packing.

Upon the periphery of the wheel disk or disks 20 is arranged a series of buckets 27 passing completely around the same. These buckets are shown in detail in Figs. 9 to 12.
The buckets thus shown are formed to receive the jets or streams at their sides or inlet ports 28, affording two impact surfaces 28' from which the fluid discharges upwardly in one stream through the exhaust ports 29, the said streams being undivided at or near the top of the buckets. As shown, the buckets are provided with a central dividing wall separating the inlet ports 28, and provide impact surfaces 28' which continue upwardly and backwardly, the separation gradually decreasing and terminating in the undivided exhaust port 29. This wall extends from the bottom upwardly with decreasing cross-sectional area whereby the two streams of fluid are caused to unite at or near the tops of said buckets.

Directing ports 30 open at each side of the buckets into the annular chamber at an acute angle to the plane of rotation of the buckets and tangentially to the rotation at that point, and are adapted to direct a stream of fluid against the impact surfaces 28' opposed to the same. Exhaust chambers 31 receive the united streams from the exhaust ports 29, which ports are of an area greater than the combined cross-sectional area of the two directing ports leading to the buckets. The number of buckets receiving fluid from the respective directing ports increases with the volume of expanded fluid, the directing ports being preferably designed so that any one port covers at all times at least one bucket. From the exhaust chambers 31, the fluid passes into the directing chambers 32 which divide the same and terminate in the next succeeding directing ports. The fluid enters the turbine through the inlet 23 and is directed through the directing chambers 32 to the directing ports 30 and the inlet ports 28 of the buckets 27. Upon entering the buckets at each side and delivering an impact or impulse, the two streams of fluid unite at the exhaust ports 29 and discharge into the exhaust chamber 31. The fluid from the exhaust chamber 31 passes to the directing chambers as shown, which terminate in the next succeeding directing ports directing other jets or streams into the buckets 27. This is continued in the turbine shown around approximately one-half of the wheel disk 20, the exhaust chambers, directing chambers and directing ports increasing in volume proportionately to suit the rate of expansion. The fluid is finally exhausted through the ports 24 to the inlet port 25 of the next succeeding wheel, and so on until final exhaust through outlet 24' to the atmosphere or into a suitable condenser. My turbine thus comprises essentially a rotating disk or wheel crowned with a series of buckets adapted to move within an annular chamber, and into which chamber are directed ports in the form of nozzles whose final direction is at an acute angle to the plane of rotation of the buckets.

The nozzles may arrive at their final direction through straight or curved paths which may be longitudinally convergent or divergent. The cross-section of these nozzles is preferably circular, though they may be any desired shape. The buckets receive the fluid upon opposite sides or impact surfaces, unite the two streams and discharge the united stream at the top into the exhaust chambers, which chambers communicate with directing chambers dividing the fluid and terminating in succeeding directing ports, and so on until final exhaust.

The turbine illustrated in the accompanying drawings is simple and inexpensive in construction, but I do not wish to confine myself to the specific construction illustrated as I may employ any other suitable constructions.

A method for the convenient division of the expansion into a number of stages upon one wheel disk is disclosed by my invention as well as the compounding of two or more such wheel disks mounted upon a common shaft. An engine capable of expanding the fluid in numerous stages, and providing therefore for a correspondingly low peripheral speed of the moving parts, is thus obtained.

The energy developed and applied in this turbine produces no lateral thrust, and the moving parts are perfectly balanced. The turbine is further adaptable for low pressure fluids making it suitable for small power and portable engines.

In the foregoing the turbine has been constructed as a prime mover. However, by applying mechanical power to the shaft, using the exhaust ports as inlet ports and the inlet ports as outlet ports, and a general reversal of action, the construction will be equally serviceable as a blower or compressor of elastic fluid; or as a pump, ejector or injector for fluids.

In my improved turbine the leakage between stages is employed in succeeding stages, and the escape of energy at the final exhaust is reduced to a small percentage of the initial energy.

In compounding a number of disks the last disk may be acted upon in one stage only, thereby avoiding any leakage which would occur between stages and utilizing all the leakage occurring in the preceding stages.

1. In a turbine: a wheel disk rotatably mounted; a series of buckets upon the periphery of same, said buckets having lateral inlet and top exhaust ports; an annular chamber in which said buckets move; directing ports directed to the side of said buckets; and exhaust chambers to receive the exhaust from said exhaust ports, said ports passing the exhaust chambers and the inlet ports passing the said directing ports; and directing chambers dividing the fluid from the said exhaust chamber and terminating in the next succeeding directing ports.

2. In a turbine: a wheel disk rotatably mounted; a series of buckets upon the periphery of same; said buckets having lateral inlet and top exhaust ports; directing ports at each side of said buckets to direct a fluid into the sides thereof; exhaust chambers at the top of said buckets to receive the exhaust fluid therefrom; and directing chambers dividing the fluid from said exhaust chambers and terminating in succeeding directing ports at each side of said buckets, and so on toward the final exhaust.

3. In a turbine: directing ports; exhaust chambers; directing chambers; and a series of buckets adapted to laterally receive the fluid from said directing ports, unite the same into a single stream exhausting into said exhaust chambers, and thence to said directing chambers which in turn divide the same and terminate in succeeding directing ports, and so on toward the final exhaust.

4. In a turbine: directing ports; a series of buckets receiving the fluid therefrom; a series of exhaust chambers to receive the discharge from said buckets, and directing chambers receiving the fluid from said exhaust chambers and terminating in succeeding directing ports for the fluid, said buckets, exhaust chambers, directing chambers and directing ports alternately uniting the fluid into a single stream from said buckets and directing the same into two streams to succeeding buckets.

5. In a turbine: two or more wheel disks mounted upon a common shaft; directing ports for a fluid; exhaust chambers; directing chambers; a series of buckets upon the periphery of said disks, said buckets being adapted to receive and unite the fluid from said directing ports, discharge the same upwardly into said exhaust chambers and thence into said directing chambers which divide the fluid into two streams and terminate in succeeding directing ports; and a conducting passage from the final exhaust of one disk to the next succeeding disk, and so on to final exhaust.

6. In a turbine: an annular chamber; directing ports opening into the sides thereof, said directing ports being in one direction at an acute angle to the plane of rotation and in the other direction tangential to the rotation at that point; exhaust chambers opening into the top of the annular chamber; and a series of buckets, each bucket adapted to move in juxtaposition to the walls of the annular chamber and having two inlet ports, said inlet ports being formed by successive buckets, the adjacent ports being separated only by the intervening material necessary for the formation of the bucket, and comprising the parts of the bucket passing opposite the directing ports, impact surfaces opposed to the direction of the directing ports separated from each other by a ridge formed by a modified continuation of said impact surfaces, the bucket from the impact surface continuing upwardly and backwardly and the separation of the impact surfaces gradually decreasing and terminating in an undivided exhaust port of an area greater than the combined crosss-ectional area of the two directing ports leading to the buckets.

Signed at New York in the county of New York and State of New York this 8th day of August A. D. 1907.

FRANK H. LINDNER

Witnesses:
FREDK. F. SCHUETZ
SALLY O. YUDIZHY.